(12) United States Patent
Wang et al.

(10) Patent No.: US 9,142,984 B2
(45) Date of Patent: Sep. 22, 2015

(54) METHOD OF SEARCHING FOR FULL CHARGE CAPACITY OF STACKED RECHARGEABLE BATTERY CELLS IN RECHARGEABLE BATTERY PACK AND BATTERY MANAGEMENT SYSTEM MADE OF THE SAME

(71) Applicant: HYCON TECHNOLOGY CORP., Taipei (TW)

(72) Inventors: Chuan Sheng Wang, Taipei (TW); Hsiang Min Lin, Taipei (TW)

(73) Assignee: Hycon Technology Corp., Taipei (TW)

( * ) Notice: Subject to any disclaimer, the term of this patent is extended or adjusted under 35 U.S.C. 154(b) by 0 days.

(21) Appl. No.: 14/186,067

(22) Filed: Feb. 21, 2014

(65) Prior Publication Data

US 2015/0244193 A1      Aug. 27, 2015

(51) Int. Cl.
  *H02J 7/00*  (2006.01)
  *H02J 7/16*  (2006.01)
  *G01R 31/36*  (2006.01)
  *G01N 27/416*  (2006.01)

(52) U.S. Cl.
  CPC ............... *H02J 7/0029* (2013.01); *H02J 7/008* (2013.01)

(58) Field of Classification Search
  CPC ...... Y02E 60/12; H02J 7/0021; H02J 7/0047; G01R 31/3624; G01R 31/3648; G01R 31/3651; G01R 31/006; G01R 31/361; G01R 31/3606; G01R 31/3682; G01R 31/3658; G01R 19/16542

USPC ............ 320/132, 119, 149; 702/63; 324/428, 324/433, 434, 427

See application file for complete search history.

(56) References Cited

U.S. PATENT DOCUMENTS

| | | | |
|---|---|---|---|
| 5,701,068 A * | 12/1997 | Baer et al. ...................... | 320/119 |
| 6,583,606 B2 * | 6/2003 | Koike et al. ................... | 320/149 |
| 7,923,966 B2 * | 4/2011 | Fukuda ......................... | 320/132 |
| 2013/0057290 A1 * | 3/2013 | Hong ............................. | 324/427 |

* cited by examiner

*Primary Examiner* — Richard Isla Rodas
*Assistant Examiner* — Mohammed Jameel Sharief
(74) *Attorney, Agent, or Firm* — Che-Yang Chen; Law Office of Michael Chen

(57) ABSTRACT

A method of searching for full charge capacity of stacked battery cells in a rechargeable battery pack and a battery management system based on the method are disclosed. The method includes the steps of: predefining an end-of-discharge condition as a ratio of change of open-circuit cell voltage to change of state of charge; providing a full charge capacity for a rechargeable battery pack assembled of several stacked battery cells; charging the rechargeable battery pack until it is fully; discharging the rechargeable battery pack; measuring current values and open-circuit cell voltages periodically; processing coulomb counting based on the measured current values and zeroing a sum of coulomb counting values when a new discharging cycle begins; estimating state of charge during discharging periodically; calculating a running ratio; and updating the full charge capacity by the current sum of the coulomb counting values when the running ratio is equal to or greater than the end-of-discharge condition.

2 Claims, 4 Drawing Sheets

METHOD OF SEARCHING FOR FULL CHARGE CAPACITY OF STACKED RECHARGEABLE BATTERY CELLS IN RECHARGEABLE BATTERY PACK AND BATTERY MANAGEMENT SYSTEM MADE OF THE SAME

FIELD OF THE INVENTION

The present invention relates to a method and battery management system of searching full charge capacity. More particularly, the present invention relates to a method and battery management system of searching full charge capacity of stacked rechargeable battery cells in a rechargeable battery pack during operation (discharge).

BACKGROUND OF THE INVENTION

Rechargeable batteries are widely used in many products, such as laptop computers, tablets, mobile phones, and even large electric vehicles and robots. Since durability of those products depends on the performance of the rechargeable batteries, use of suitable rechargeable batteries and careful maintenance for them are very important during the lifespan of those products.

Recently, among all rechargeable batteries, nickel-cadmium batteries, nickel-hydrogen batteries, nickel-zinc batteries and lithium batteries are more and more popular because they have stable physical characteristics and smaller size for stacking. They can also be charged or discharged with no or limited memory effects. Besides, these rechargeable batteries have very low self-discharge rate and high energy density. However, since they often use with sub-battery sets (or cells) connected in series/parallel, poor performance may be caused by unbalance of the sub-battery sets during charge or discharge. In order to avoid battery unbalance and utilize the best performance of these rechargeable batteries, monitor of power capacity of these rechargeable batteries is very commonly executed in battery management systems (BMS). Full charge capacity (FCC) is an index of power capacity. The FCC of a rechargeable battery is set to be a certain value when the rechargeable battery is produced in a factory. However, it will gradually decrease as the rechargeable battery is repeatedly charged and discharged. Thus, the FCC needs to be updated often for each rechargeable battery to check current status.

A prior art to determine the FCC of a rechargeable battery is disclosed in US Patent Application No. 20130057290. Please refer to FIG. 1. It is a flowchart of the mentioned application. A battery performs charging and discharging operations according to the control of a battery protection circuit (S1). When a charger is electrically connected to a battery pack, the charging operation is performed. When an electronic device is connected to the battery pack, the discharging operation is performed. A monitoring unit monitors each cell of the battery in series during the charging and discharging operations of the battery to measure at least one of voltage, current, and temperature of the battery (S2). A control unit receives monitoring results from the monitoring unit, and determines whether the monitoring results satisfy FCC updating conditions of the battery (S3). For example, the control unit determines whether the measured values of the voltage, the current, and the temperature of the battery matches the corresponding values stored in a preset table. If it is determined that the updating conditions are not satisfied in operation (S3), the process returns to operation (S1). In addition, the battery repeatedly performs the charging and discharging operations, and the monitoring unit performs the monitoring substantially continuously. On the other hand, if it is determined that the updating conditions are satisfied in operation (S3), it is determined whether the time point where the conditions are satisfied is included during a rising period of the voltage of the battery (S4). For example, it is determined whether the discharging operation of the battery is discontinued. When it is determined that the voltage of the battery rises in operation (S4), the process returns to operation (S1). On the other hand, when it is determined that the voltage of the battery does not rise, the FCC of the battery is updated and the updated FCC is stored in a recording unit (S5).

Although the prior doesn't point out a specified means to calculate the FCC, it indicates updating conditions that a calculated FCC for each cell in the battery is acceptable under the conditions. Meanwhile, since there are many rechargeable battery cells assembled inside the battery in series, the FCC of the battery is set to be the smallest FCC among the FCCs of the all rechargeable battery cells. As there will be slightly battery unbalance among the rechargeable battery cells during measurement, the FCC should reflect a real situation so that people know if the battery needs to repair or not. Once after repairing, some rechargeable battery cells are replaced, the updating conditions need to re-check again. It is too complex while operating.

Hence, a more simplified and effective method to search for FCC of stacked rechargeable battery cells during operation is desired.

SUMMARY OF THE INVENTION

The known method to the FCC of a rechargeable battery can not adjust the updating conditions without monitoring each cell in the battery with change of physical characteristics of the rechargeable battery.

Therefore, a more simplified and effective method to search for FCC of stacked rechargeable battery cells during operation should be developed. The method should be able to applied to rechargeable batteries (battery sets) assembled by a number of stacked rechargeable battery cells.

Hence, according to an aspect of the present invention, a method of searching for full charge capacity (FCC) of stacked rechargeable battery cells in a rechargeable battery pack is provided. The method includes the steps of: predefining an end-of-discharge condition as a ratio of change of open-circuit cell voltage (OCV) to change of state of charge (SOC); providing a FCC for a rechargeable battery pack assembled by a plurality of stacked battery cells linked in series and/or parallel; charging the rechargeable battery pack until it is fully charged; discharging the rechargeable battery pack; measuring current values and OCVs periodically; processing coulomb counting based on the measured current values and zeroing a sum of coulomb counting values when a new discharging cycle begins; estimating SOC during discharge periodically; calculating a running ratio of change of the measured OCV to change of the estimated SOC in a time frame; and updating the FCC by the current sum of the coulomb counting values when the running ratio is equal to or greater than the end-of-discharge condition.

According to another aspect of the present invention, a battery management system capable of searching for FCC of rechargeable stacked battery cells in a rechargeable battery pack is disclosed. The battery management system includes: a voltage detecting unit, electrically connected to a rechargeable battery pack assembled by a plurality of stacked battery cells linked in series and/or parallel, for measuring OCVs of the rechargeable battery pack periodically; a current measuring unit, electrically connected to the rechargeable battery pack, for measuring current values of the rechargeable battery pack periodically, processing coulomb counting based on the measured current values and zeroing a sum of coulomb counting values when a new discharging cycle begins; a memory unit, for storing and updating the FCC of the rechargeable battery pack; a switching unit, for switching on-off of a circuit controlling charging and discharging of the rechargeable battery pack; and a controlling unit, linked to the voltage detecting unit, current measuring unit, memory unit and switching unit, for periodically estimating SOC of the rechargeable battery pack when the rechargeable battery pack discharges, calculating a running ratio of change of the measured OCV to change of the estimated SOC in a time frame, updating the FCC in the memory unit by the current sum of the coulomb counting values when the running ratio is equal to or greater than an end-of-discharge condition and controlling the switching unit to process charge or discharge. The end-of-discharge condition is a ratio of change of OCV to change of SOC and predefined in the controlling unit, a preset FCC has been stored in the memory unit before the rechargeable battery set starts to be charged, and the switching unit is switched to charge the rechargeable battery pack until it is fully charged then switched to let the rechargeable battery pack discharge.

The method according to the present invention can obtain the FCC of the rechargeable battery set by measuring OCV and calculating SOC under normal operation of the rechargeable battery set. With the updated FCC, the battery management system can process further evaluations of efficacy. The FCC provided from the present invention can be adjusted according to the decreased degree of physical characteristics of the rechargeable battery cells. No calibrating or reference data is required. It is easy to operate.

DETAILED DESCRIPTION OF THE PREFERRED EMBODIMENT

The present invention will now be described more specifically with reference to the following embodiment.

Figure 1:
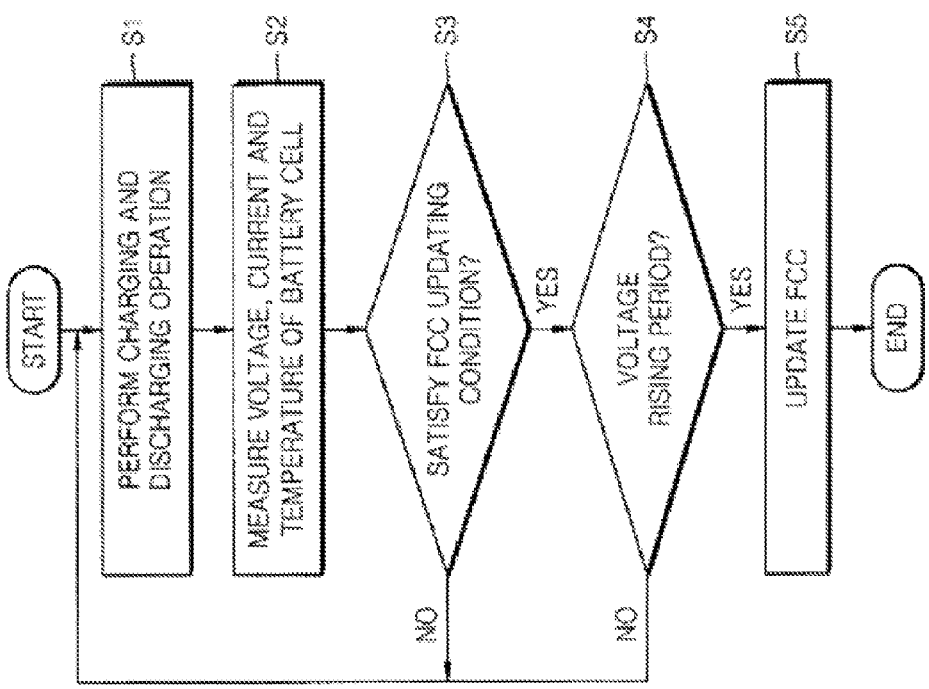
FIG. 1 is a flowchart of a prior art for determining full charge capacity of a battery.
Figure 2:
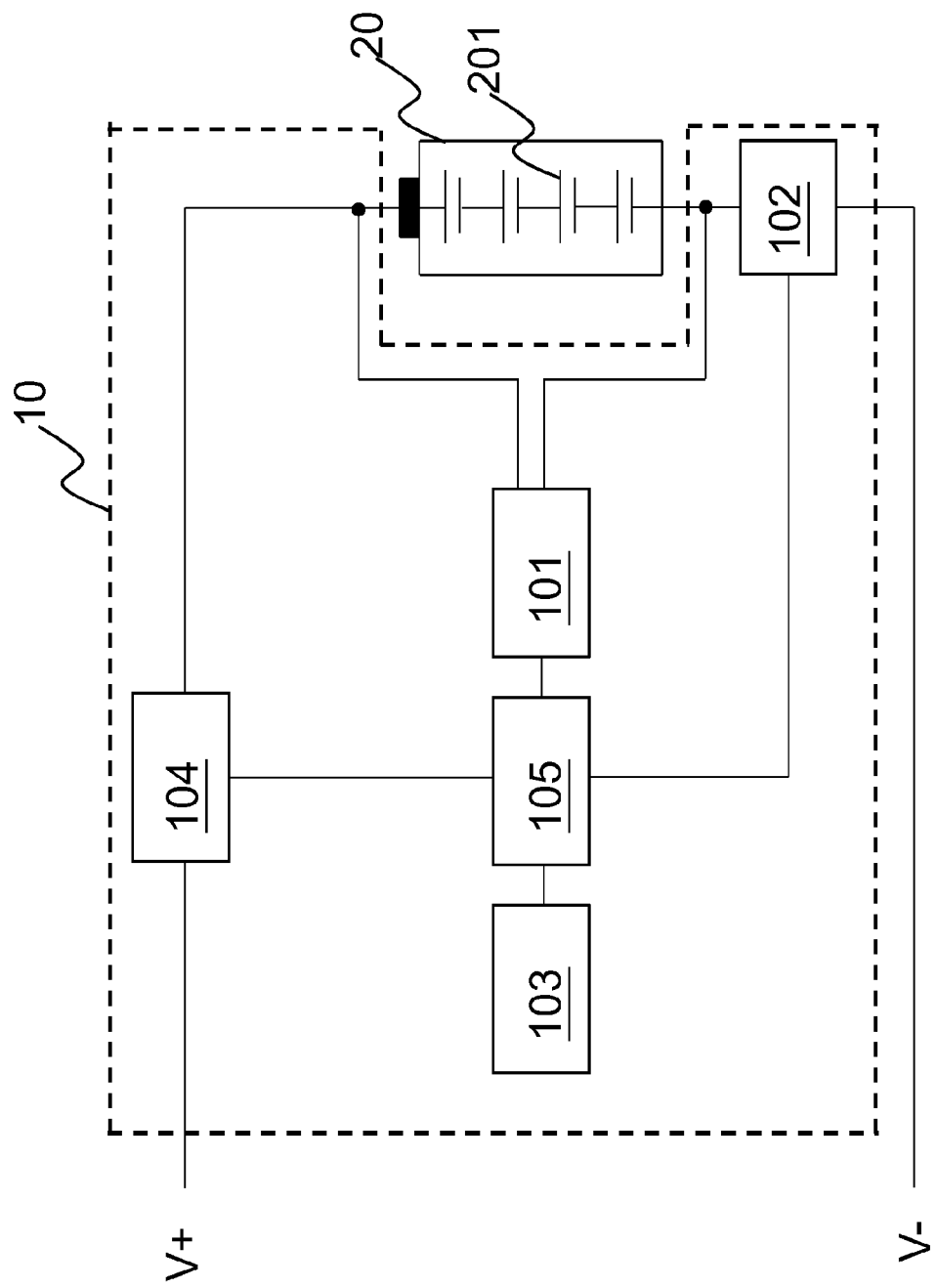
FIG. 2 is a block diagram of battery management system according to the present invention.
Figure 3:
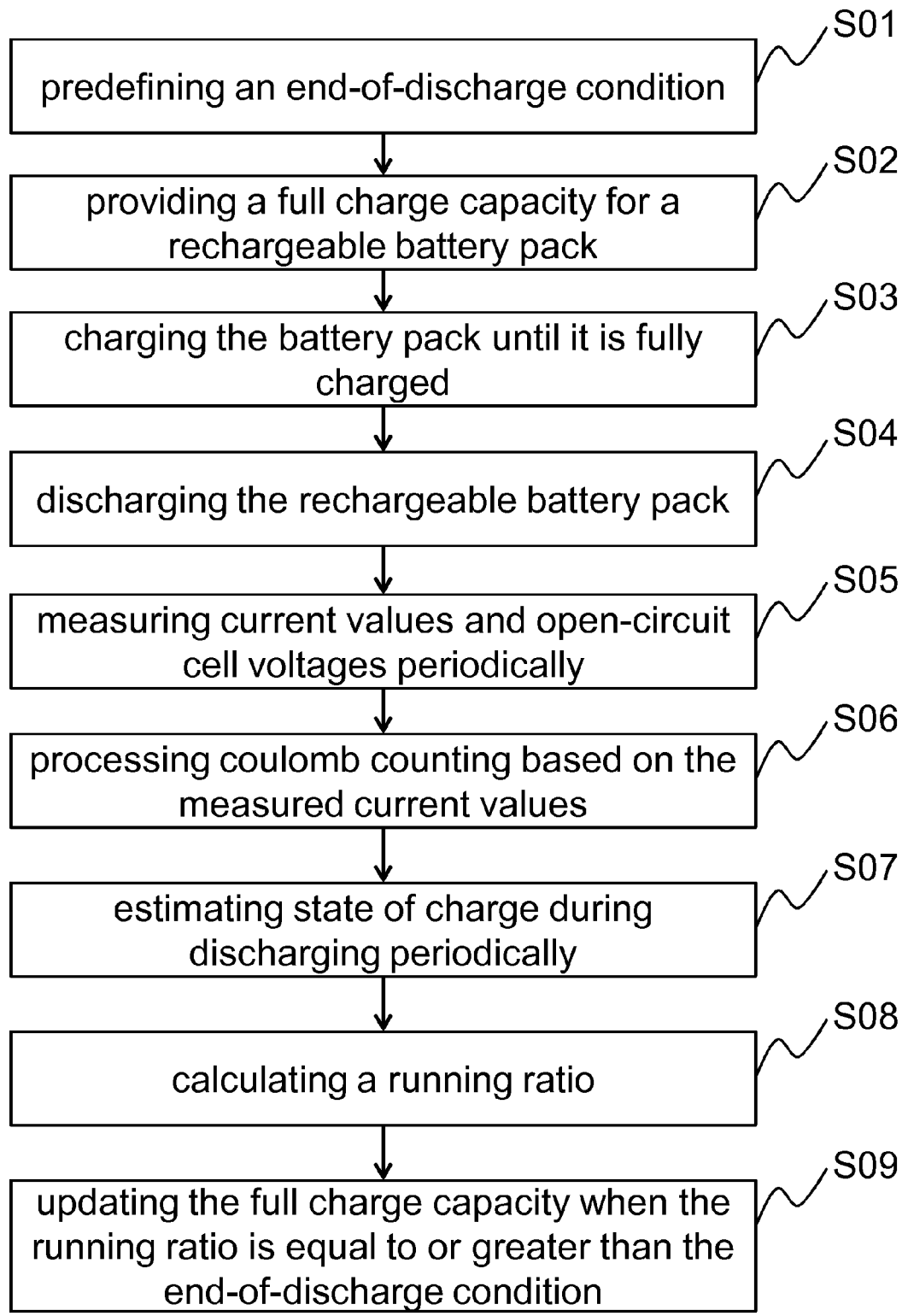
FIG. 3 is a flowchart of a method to determining full charge capacity of a rechargeable battery pack according to the present invention.
Figure 4:
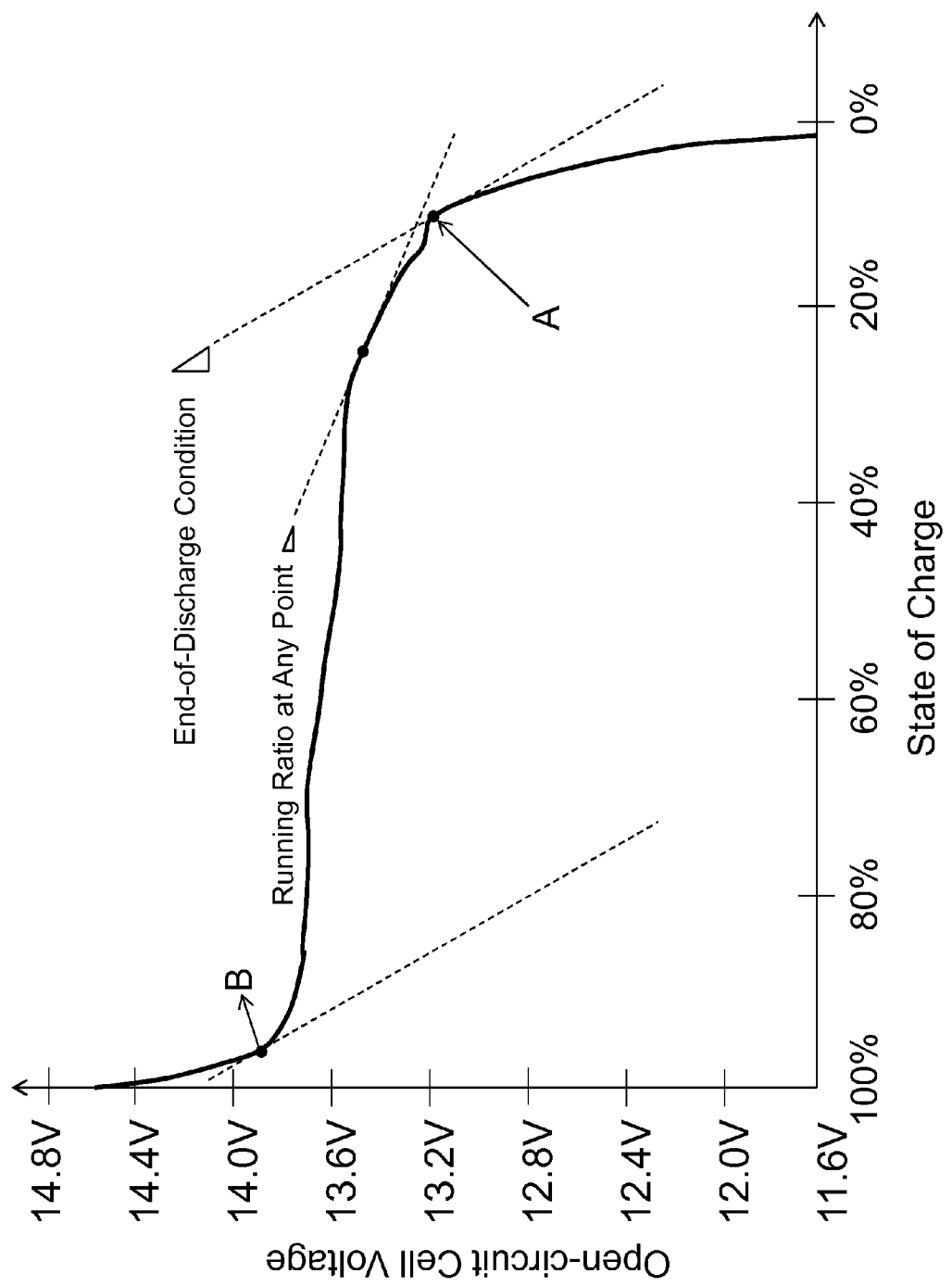
FIG. 4 shows a relationship of open-circuit cell voltage vs. state of charge when the rechargeable battery pack discharges.

Please refer to FIG. 2 to FIG. 4. FIG. 2 is a block diagram of battery management system according to the present invention. FIG. 3 is a flowchart of a method to determining full charge capacity (FCC) of a rechargeable battery pack according to the present invention. FIG. 4 shows a relationship of FCC vs. state of charge (SOC) when the rechargeable battery pack discharges.

The method provided in the present invention can be fulfilled by a battery management system installed in a rechargeable battery. It can also be applied to a standalone device to determine FCC of a rechargeable battery pack assembled by a number of stacked rechargeable battery cells linked in series and/or parallel. In order to illustrate the present invent in a comprehensive way, only a battery management system is used in the embodiment. No more detail of the standalone device will be described.

A battery management system 10 (enclosed by dashed lines) according to the present invention is shown in FIG. 2. The battery management system 10 is electrically connected with a rechargeable battery pack 20 and capable of searching for the FCC of stacked rechargeable battery cells 201 in the rechargeable battery pack 20. It is composed of a voltage detecting unit 101, a current measuring unit 102, a memory unit 103 and a controlling unit 105. Functions of each element will be described first then the processes will be illustrated later.

The voltage detecting unit 101 is electrically connected to the rechargeable battery pack 20 across its terminals in series. The rechargeable battery pack 20 is assembled by 4 rechargeable battery cells 201 linked in series. According to the preset invention, the number of the rechargeable battery cells 201 is not limited to 4. It can be any number greater than 1. The way that the rechargeable battery cells 201 linked is not limit to series connection. It can be parallel connection or a composition combining both series connection and parallel connection. The voltage detecting unit 101 is used to measure open-circuit cell voltages (OCVs) of the rechargeable battery pack 20 periodically. Here, a time interval between two successive measurements of the OCVs can be any desired time according to the requirement a rechargeable battery which uses the rechargeable battery pack 20. For example, it can be as short as 20 ms or more than 1 s.

The current measuring unit 102 is electrically connected to the rechargeable battery pack 20. It measures current values of the rechargeable battery pack 20 periodically. Similarly, a time interval between two successive measurements of the current values can also be any desired time. The time interval can be the same as that between two successive measurements of the OCVs or different. In this embodiment, both time intervals are set to be 0.1 s and collected synchronously. The current measuring unit 102 can further process coulomb counting based on the measured current values. The current measuring unit 102 plays like a coulomb counter and zeros a sum of coulomb counting values when a new discharging cycle begins. It just times each measured current value by the time interval between two measurements and keeps accumulating the result of the multiplication.

The memory unit 103 can store a value of the FCC of the rechargeable battery pack 20. It can also update the stored FCC when an updated FCC is received. The FCC stored can be provided as a reference for the operation of the rechargeable battery, for example, calculation of remaining capacity. The switching unit 104 can switch on-off of a circuit to where the rechargeable battery pack 20 is linked for operation so as to control charging and discharging of the rechargeable battery pack 20.

The controlling unit 105 is linked to the voltage detecting unit 101, current measuring unit 102, memory unit 103 and switching unit 104. It works to periodically estimate SOC when the rechargeable battery pack 20 discharges, calculate a running ratio of change of the measured OCV to change of the estimated SOC in a time frame, and update the FCC in the memory unit 103 by the current sum of the coulomb counting values when the running ratio is equal to or greater than an end-of-discharge condition. The time frame can be any suitable duration. In this embodiment, the time frame is the same as that between two successive measurements of the OCVs, 0.1 s. The controlling unit 105 can also controls the switching unit 104 to process charge or discharge of the rechargeable battery pack 20.

Please refer to FIG. 3. The operation of the battery management system 10 is illustrated with reference to corresponding step in the flowchart in FIG. 3. First, an end-of-discharge condition is predefined as a ratio of change of OCV to change of SOC in the memory unit 103 (S01). In order to have a better understanding of the end-of-discharge condition, please see FIG. 4. The OCV across the terminals of the rechargeable battery pack 20 is maximized when each stacked rechargeable battery cell 201 is fully charged. Typically, not every stacked rechargeable battery cell 201 is necessary fully charged when a preset FCC is met.

From FIG. 4, it is obvious that, the measured OCV decreases since OCV of each stacked rechargeable battery cells 201 decreases during discharge. Although the voltage decrease situation for each rechargeable battery cells 201 might differ in some degree, the measured OCV of the rechargeable battery pack 20 behaves as the summation of each OCV of the rechargeable battery cells 201. The curve of OCV vs. SOC drops sharply after the rechargeable battery pack 20 starts to discharge. After a period of time of discharge, the slope of the curve becomes flatter. When the rechargeable battery pack 20 outputs most of its power, the curve drops again. The steep slope of the curve means most of the rechargeable battery cells 201 are going to use their stored power at this moment. According to FIG. 4, the end-of-discharge condition is represented by a triangle where an angle close to the right angle shows the slope of end-of-discharge condition. Once a ratio of decrease of OCV to the change of SOC is the same as or greater than the slope, it means the end-of-discharge condition meets. It should be emphasized that although there might be two curve drops (Point A and Point B) with slopes the same as or greater than the slope of the end-of-discharge condition, only the later one (Point A) can be determined as the end-of-discharge condition for the rechargeable battery pack 20 is going to use out its stored power.

Then, provide a FCC for the rechargeable battery pack 20 (S02). The FCC can be a rated value after the rechargeable battery pack 20 was manufactured. It can also be any estimated value based on experience. The FCC is used for any battery management purposes before it is updated. It should be noticed that the FCC is not necessary to be the power capacity from fully charged energy to no energy stored in all rechargeable battery cells 201. If so, some rechargeable battery cells 201 might be damaged due to over discharge. Despite of battery cell unbalance, when one of the rechargeable battery cells 201 can not output power, the discharge of the rechargeable battery pack 20 should stop.

Next, charge the rechargeable battery pack 20 until it is fully charged (S03). Then, discharge the rechargeable battery pack 20 (S04). Measure current values and open-circuit cell voltages (OCVs) periodically (S05). As mentioned above, the time interval is 0.1 s.

After the discharge of the rechargeable battery pack 20 begins, the current measuring unit 102 processes coulomb counting based on the measured current values (S06). The coulomb counting algorithms are simple and a sum of coulomb counting values is zeroed when a new discharging cycle begins. Time the measured current value with 0.1 s and accumulate the results. The final sum of the coulomb counting values when discharge stops can be the FCC.

Next, the controlling unit 105 estimates SOC during discharge periodically (S07). It should be emphasized that there are many methods to estimate SOC. As long as the method is suitable for the design of the rechargeable battery pack 20, it can be applied. Then, the controlling unit 105 calculating a running ratio of change of the measured OCV to change of the estimated SOC in a time frame (S08). Last, the controlling unit 105 updates the FCC by the current sum of the coulomb counting values when the running ratio is equal to or greater than the end-of-discharge condition (S09).

Please refer to FIG. 4. Point A satisfies the criteria to stop discharge and determine the updated FCC. The discharge will stop at point A. It should be emphasized that the end-of-discharge condition must be chosen to prohibit over discharge of the rechargeable battery pack 20. A careful decision of the end-of-discharge condition is important.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method of searching for full charge capacity (FCC) of stacked rechargeable battery cells in a rechargeable battery pack, comprising the steps of:
    predefining an end-of-discharge condition as a ratio of change of open-circuit cell voltage (OCV) to change of state of charge (SOC);
    providing a FCC for a rechargeable battery pack assembled by a plurality of stacked rechargeable battery cells linked in series and/or parallel;
    charging the rechargeable battery pack until it is fully charged;
    discharging the rechargeable battery pack;
    measuring current values and OCVs of the rechargeable battery pack periodically;
    processing coulomb counting based on the measured current values and zeroing a sum of coulomb counting values when a new discharging cycle begins;
    estimating SOC of the rechargeable battery pack during discharge periodically;
    calculating a running ratio of change of the measured OCV to change of the estimated SOC in a time frame; and
    updating the FCC by the current sum of the coulomb counting values when the running ratio is equal to or greater than the end-of-discharge condition.

2. A battery management system capable of searching for FCC of rechargeable stacked battery cells in a rechargeable battery pack, comprising:
    a voltage detecting unit, electrically connected to a rechargeable battery pack assembled by a plurality of stacked rechargeable battery cells linked in series and/or parallel, for measuring OCVs of the rechargeable battery pack periodically;
    a current measuring unit, electrically connected to the rechargeable battery pack, for measuring current values through the rechargeable battery pack periodically, processing coulomb counting based on the measured current values and zeroing a sum of coulomb counting values when a new discharging cycle begins;
    a memory unit, for storing and updating the FCC of the rechargeable battery pack;
    a switching unit, for switching on-off of a circuit controlling charging and discharging of the rechargeable battery pack; and
    a controlling unit, linked to the voltage detecting unit, current measuring unit, memory unit and switching unit, for periodically estimating SOC of the rechargeable battery pack when the rechargeable battery pack discharges, calculating a running ratio of change of the measured OCV to change of the estimated SOC in a time frame, updating the FCC in the memory unit by the current sum of the coulomb counting values when the running ratio is equal to or greater than an end-of-discharge condition and controlling the switching unit to process charge or discharge;

wherein the end-of-discharge condition is a ratio of change of OCV to change of SOC and predefined in the controlling unit, a preset FCC has been stored in the memory unit before the rechargeable battery set starts to be charged, and the switching unit is switched to charge the rechargeable battery pack until it is fully charged then switched to let the rechargeable battery pack discharge.

* * * * *